United States Patent [19]

Kubisiak et al.

[11] 3,953,736

[45] Apr. 27, 1976

[54] METHOD OF AND APPARATUS FOR MEASURING THE THICKNESS OF OBJECTS

[75] Inventors: Helmut Kubisiak, Leverkusen; Dietrich Sorgenicht, Opladen, both of Germany

[73] Assignee: Exatest Messtechnik, Opladen, Germany

[22] Filed: Oct. 17, 1974

[21] Appl. No.: 515,471

[30] Foreign Application Priority Data

Oct. 19, 1973 Germany............................ 2352522

[52] U.S. Cl............................. 250/358 R; 250/336
[51] Int. Cl.² .......................................... G01J 1/00
[58] Field of Search .................................... 250/358

[56] References Cited
UNITED STATES PATENTS

| | | | |
|---|---|---|---|
| 2,922,888 | 1/1960 | Faukner............................ | 250/358 |
| 3,612,876 | 12/1971 | Grant................................. | 250/358 |

*Primary Examiner*—Harold A. Dixon
*Attorney, Agent, or Firm*—William R. Sherman; Kevin McMahon

[57] ABSTRACT

Disclosed is a method of and an apparatus for measuring the thickness of an object, usually a metal strip, by using a radiation beam and digital techniques and, more generally, a method of linearization of an exponential function which can be advantageously implemented by digital techniques. First, a counter is preset to a count corresponding to a predetermined magnitude of a value to be linearized. Then, a sequence of pulses whose number is representative of the value to be linearized is generated. The pulses of this sequence are counted so as to generate a signal each time the number of pulses counted corresponds to a standard value unit. Each signal so generated is used to modify by a predetermined count the count of the preset counter whereby, at the end of the sequence, the contents of the preset counter is representative of the value to be linearized.

An apparatus for implementing such a linearization method when applied to the output signal of a radiation detector providing a pulse rate representative of the thickness of an object through which the radiation of a gamma source is received, comprises a gate which receives the output signal of the radiation detector and is enabled during a preset time. The output pulses of the gate are applied simultaneously to a first counter, a divider and a second counter. The first counter provides a signal when its count reaches a value corresponding to the maximum thickness which is expected to be measured. The output signal of the first counter resets the second counter and presets a down counter to a count corresponding to the quotient of the maximum thickness by a standard thickness unit. The divider divides the number of pulses by a coefficient representative of a standard thickness unit and the output pulses of the divider are accumulated in an accumulator. The accumulated sum is compared in a comparator against the contents of the second counter and the output signal of the comparator is applied to the down counter and to the reset input of the second counter. When all the pulses have been counted, the down counter displays the thickness of the object.

Other embodiments for compensating the dead-time of the radiation detector and the decay of the radiation source as well as for increasing the accuracy of the measurement are also described.

15 Claims, 3 Drawing Figures

METHOD OF AND APPARATUS FOR MEASURING THE THICKNESS OF OBJECTS

BACKGROUND OF THE INVENTION

1. Field of the invention

The invention relates to a method for thickness measurement as well as to an apparatus for implementing such a method and more generally to a method of linearization of an exponential function as well as to an apparatus for the implementation thereof.

An apparatus for measuring the thickness of an object usually comprises a radiation source having a known intensity disposed on one side of the object and a radiation detector on the other side thereof. The frequency of the pulses delivered by the radiation detector is inversely related to the intensity which has been attenuated as the result of the absorption by the object the thickness of which is to be measured.

2. Description of the prior art

Apparatus of this type are known. As a source of radiation, a gamma radiation or a radioactive isotope can be used, for example, isotope $Cs^{137}$ is used if thick sheets of metal are to be measured. As radiation detectors, it is well known to use ionization chambers or scintillators coupled to a photomultiplier. The latter is usually preferred because it permits operation with a narrow collimated beam which alleviates some problems of protection against radiation. However, in both cases, the output of the radiation detector is a sequence of statistically distributed pulses.

In prior art apparatus this pulse sequence is converted by a transducer into an analog singal the magnitude of which is proportional to the average number pulses within a time interval. In order to operate at the same point on the characteristic curve whatever the thickness of the object may be, absorption sheets having known absorption are introduced across the beam, and the number of absorption sheets which are so introduced is taken into consideration for determining the actual thickness of the object to be measured.

The main drawbacks of this type of apparatus are, on the one hand, the use of a mechanical device for introducing the absorption sheets, which is a source of trouble in a rolling mill with its inherent rough environmental conditions and, on the other hand, the measuring errors due to drift and offset of the analog circuits.

It is the primary object of the invention to provide a method of and an apparatus for measuring the thickness of an object in which the above-mentioned drawbacks are eliminated.

SUMMARY OF THE INVENTION

According to the present invention, a method of measuring the thickness of an object, such as a metal strip, comprises a first step of presetting a counter to a count corresponding to a predetermined value of the thickness of the object. Then, a sequence of pulses whose number is representative of the thickness of the object is generated. The pulses of this sequence are counted so as to generate a signal each time the number of pulses counted corresponds to a standard thickness unit. Each signal so generated is used to modify by a predetermined count the count of the preset counter whereby, at the end of the sequence, the contents of the preset counter gives the thickness of the object.

As it is well known in the art of thickness gauges using the absorption phenomenon of a radiation, the amount of radiation absorbed by an object depends upon the thickness of the object according to an exponential function. Therefore, it can be readily understood that the above set forth method can be easily adapted to the determination of the value of a variable, the variation of which has an effect which varies according to an exponential function, the amplitude this effect being known from the operator.

As the calculation is not made for each point of the exponential characteristic but only for predetermined points separated by an integer multiple of a standard thickness unit, the above set forth method corresponds in fact to a linearization of an exponential function.

According to the present invention, an apparatus for measuring the thickness of an object, such as a metal strip, comprises a radiation source disposed on one side of the object and a radiation detector on the other side. Depending upon the type used, the radiation detector provides either an analog signal the amplitude of which is representative of the thickness of the object or pulses the number of which per time unit is also representative of the thickness of the object. If a radiation detector of the analog type is used, the analog signal will be converted into a sequence of pulses the number of which will be representative of the thickness. The sequence of pulses is applied simultaneously to a first counter, a divider and a second counter. The first counter provides a signal when its count reaches a value corresponding to the maximum thickness which is expected to be measured. The output signal of the first counter resets the second counter and presets a down-counter to a count corresponding to the quotient of the maximum thickness by a standard thickness unit. The divider divides the number of pulses by a coefficient representative of the standard thickness unit and the output pulses of the divider are accumulated in an accumulator. The accumulated sum is compared in a comparator against the contents of the second counter and the output signal provided by the comparator when both numbers are equal is applied to the down-counter and to the reset input of the second counter. When all the pulses have been counted, the down-counter displays the thickness of the object.

With high pulse rates, a phenomenon known as deadtime of the radiation detector is encountered, and according to the present invention, the effect of this deadtime phenomenon is compensated by changing the dividing coefficient of the divider as a function of the pulse rate.

An interpolation circuit receiving the output pulses of the divider is also used to approximately determine the thickness of the object at a fraction of the standard thickness unit.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DESCRIPTION OF AN ILLUSTRATIVE EMBODIMENT

Figure 1:
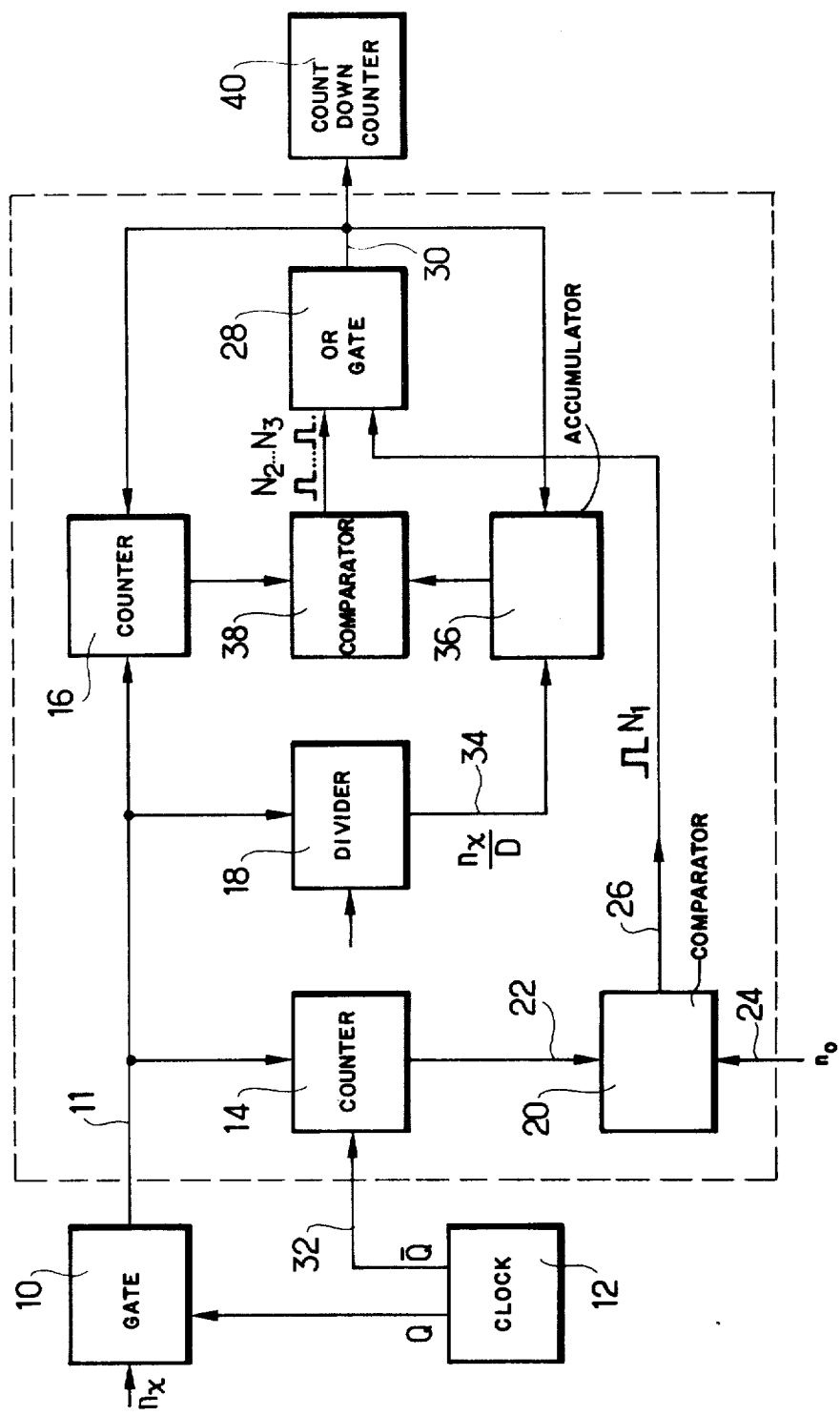
FIG. 1 is a block diagram of a linearization circuit according to the present invention.

Prior to entering into the description of the embodiments illustrating the present invention, it is worthwhile setting forth the basic principles of the present invention.

The rate $n_o$ of the pulses received by a radiation detector disposed on the one side of the object to be measured opposite the radiation source is given by the exponential function $$n_o = n \exp - ux_o \qquad 1$$

wherein $n$ is the pulse rate when the object is not located across the radiation beam, $x_o$ the thickness of the object and $u$ is the absorption coefficient. The absorption coefficient is dependent upon the material but may be assumed to be constant for given material composition (alloy) and temperature.

It may now be assumed that the object of thickness $x_o$ is replaced by another object of thickness $x_1 = x_o - d$. The pulse rate will be $$n_1 = n \exp - u(x_o - d) = n_o \exp ud = n_o(1 + 1/D) \qquad 2$$

where $D$ is given by $$D = 1/(\exp ud) - 1 \qquad 3$$

and corresponds to a "thickness unit" $d$.

At first, it will be noted that $D$ itself does not depend upon the pulse rate and that for further reduction of the thickness by a further thickness unit $d$, the pulse rate $n_2$ will be given by $$n_2 = n_1 (1 + 1/D) \qquad 4$$

or by the general formula $$n_{y+1} = n_y (1 + 1/D) \quad (y = 0, 1, 2 ...) \qquad 5$$

From (5) it can be shown that the pulse rate $n_a$ for a thickness $x_a = x_o - ad$, $a$ being an integer, is given by $n_a = n_o (1 + 1/D)^a$, this latter formula showing that a can be determined by counting how many times $n_o$ must be counted to obtain the pulse rate $n_a$ as measured.

It can be easily understood that the above described method corresponds to a linearization of the exponential function by thickness steps of value $d$.

Equation (1) shows that $n_o$ depends upon the basic intensity $n$ of the source, the absorption coefficient $u$, and the nominal thickness $x_o$. When starting up the thickness gauge, the pulse rate $n_o$ must be measured with an object having a known thickness. The decay of the source activity can be compensated by readjustment of the value $n_o$. The variations of the absorption coefficient $u$ as a function of the alloy composition and temperature can be computed for determining the actual thickness value.

It will be noted that the linearizing process of the exponential function can start from a minimum thickness instead of starting from a maximum one as set forth above.

For very high pulse rates, it is possible that the radiation detector may not be able to detect several pulses separated by a time interval smaller than a pulse duration. This results in a dead-time which exponentially depends upon the counting rate. Hence, to eliminate the effect of this dead-time on the accuracy, an embodiment is provided in which the dividing coefficient is changed according to the pulse rate.

Embodiments for implementing the linearizing process of the present invention will be now described with reference to FIGS. 1, 2 and 3 in which only the elements necessary to the understanding of the present invention are shown and therefore no control circuits or power supplies have been shown. In addition like elements in the three figures are referred to with like references.

Referring now to FIG. 1, the output pulses at the rate $n_x$ provided by the radiation detector (not shown) are fed to a gate 10 which is enabled by a signal provided by a clock unit 12 during preset time intervals of one second each for example. During this time interval, $n$ pulses pass through the gate 10 and are fed via a line 11 to the counting inputs of counters 14 and 16 and of a divider 18.

It will be assumed that a pulse rate $n_o$ corresponds to the maximum thickness of the object to be measured, said object being thinner than this maximum by one or more units, each unit being equal to 0.1 millimeter for example. The value of $D$ corresponding to this thickness unit is calculated in accordance with equation (3).

At first, it will be detected when the number of pulses at the rate $n_x$ reach the number $n_o$. For this purpose, a comparator 20 is fed at one of its input 22 with the instantaneous count of counter 14 while its other input 24 is fed with the number $n_o$. Upon coincidence, the output 26 of the comparator delivers a pulse N1 to a line 30 via an OR gate 28. This pulse occurs once and only one during each measuring time interval. The full capacity of counter 14 is chosen in such a manner that even for very thin objects, no over-flow occurs. The counter 14 is reset at the end of each measuring time interval by a pulse from the clock unit 12 on a RESET conductor 32.

When pulse $N_1$ occurs, $n_o/D$ pulses have been fed to an accumulator 36 via a conductor 34. The pulse N1 on the conductor 30 will, on the one hand, reset the counter 16 whose count is $n_o$ and, on the other hand, control the presentation of the contents of the accumulator 36, i.e., the number $n_o/D$, to one of the inputs of a second comparator 38.

When $n_o$ pulses have been counted, the following pulses are applied via the gate 10, to the input of the counter 16 and, as soon as further $n_o/D$ pulses have been counted, the contents of counter 16 is equal to the contents of the accumulator 36. Consequently, the comparator 38 delivers a pulse $N_2$ which is applied to the line 30 via the OR gate 28. The pulse $N_2$ resets the counter 16 and causes the application of the number now stored in the accumulator 36 to the input of the comparator 38. This number is $n_o/D$ (from the first phase), plus $n_o/D^2$ (from the second phase), i.e. equal to $$n_o/D (1 + 1/D).$$

As soon as the counter 16 has counted up to this latter number, an output pulse $N_3$ appears at the output of the comparator 38 and the number of pulses which have passed through the gate 10 is $$n_o + n_o/D + n_o/D + n_o/D^2 = n_o (1 + 1/D)^2 = n_2 \qquad 6$$

At the end of the following cycle, the comparator will provide a pulse N4 which will correspond to a total count of $$n_o + n_o/D + n_o/D + n_o/D^2 + (n_o/D + n_o/D^2 + n_o/D^2 + n_o/D^3) = n_1 + n_2/D = n_3 \qquad 7$$

and so on.

The foregoings show that each pulse N2 . . . N4 on the line 30 will represent a deviation of the thickness by one thickness unit with respect to a maximum thickness $x_o$ corresponding to a count $n_o$. Therefore, the pulses on the line 30 are applied to a count-down counter 40 which has been preset to the quotient of thickness $x_o$ by the thickness unit. If, for example, the maximum thickness is $x_o = 100$ mm and the thickness unit 0.1 mm, counter 40 will be preset to 1,000. If the thickness of the object is precisely 100 mm just the first pulse $N_1$ will occur and accordingly the counter 40 will display 99.9. A computation to be disclosed hereinafter will give a better accuracy and 99.99 will be displayed. It will be noted that the counter 40 can be preset to 100.1 (without interpolation) or 100.01 (with interpolation).

Figure 2:
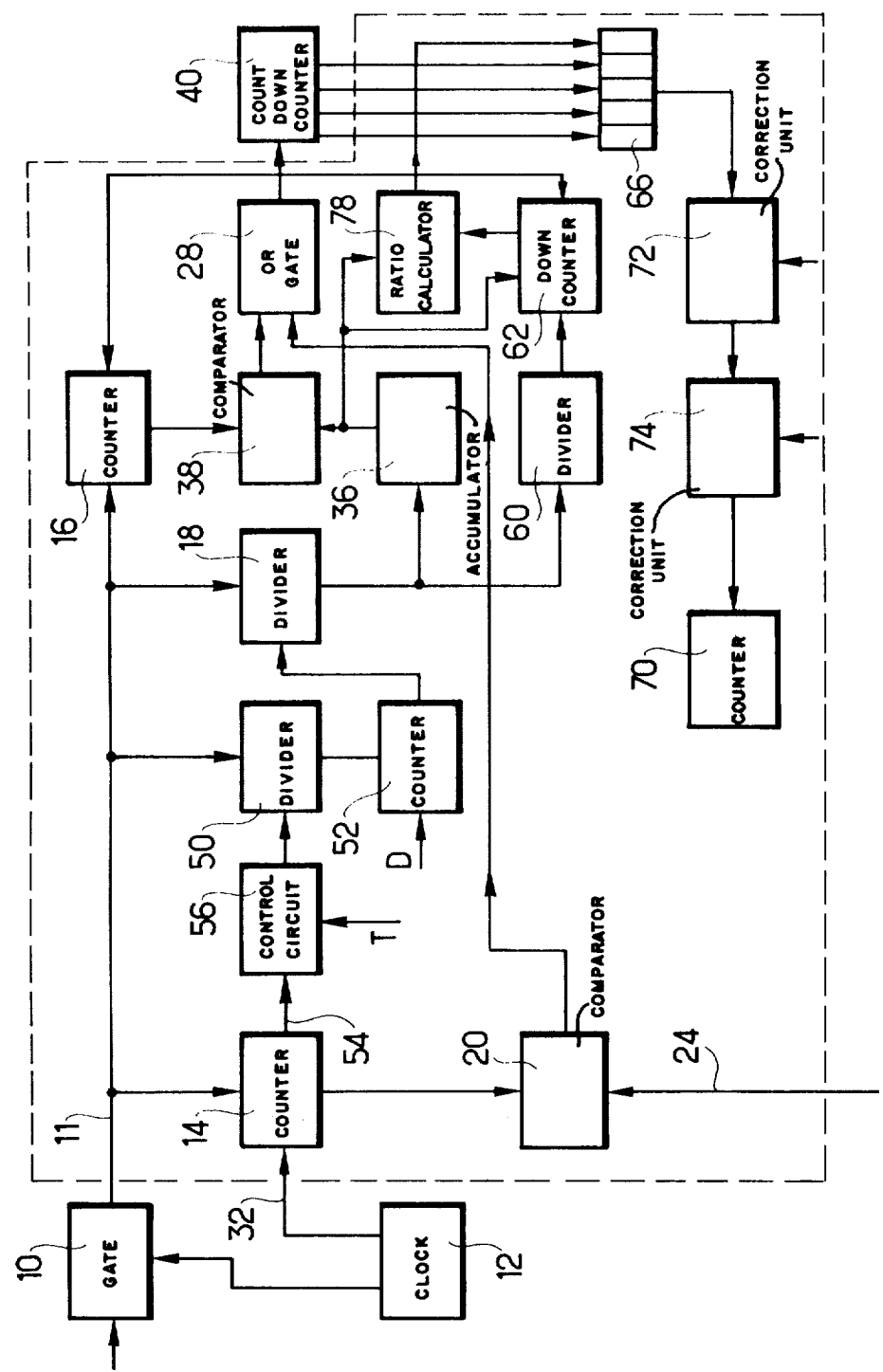
FIG. 2 is a block diagram of another linearization circuit with improved accuracy according to the present invention.

FIG. 2 is a block diagram of a circuit in which the dead-time of the radiation detector is compensated. It can be assumed that the digital circuits have a dead-time negligible in comparison with the detector dead-time so that count losses due to the circuits are negligible. The maximum frequency response to the detector is about 100 MHz. With a higher pulse repetition frequency — which may easily occur — the measured pulse number $n'_x$ will be smaller than the real pulse number $n_x$ and will vary according to the equation.

$$n'_x = n_x \exp - n_x T \qquad 8$$

in which $T$ represents the dead-time. This dead-time phenomenon has the effect of obtaining thickness values which are smaller than the actual one. According to the present invention, this effect is compensated by increasing the value of the dividing coefficient $D$ as a function of the number of pulses within a measuring time interval.

For a given thickness range, the circuits for implementing the dead-time correction comprises a divider 50 carrying out a division by N of the number of pulses in a sequence. The output pulses of the divider 50 are applied to an up counter 52 which is preset at the count D at the beginning of each measuring interval. The contents of the counter 52 is applied to the divider 18 so as to change the dividing coefficient thereof. The dividing coefficient of the divider 50 is furnished by a control circuit 56 which carries out the computation of N as a function of the dead-time T and of the thickness range. For this purpose, the control circuit 56 receives the value of T on one of its two input terminals and the contents of the counter 14 on the other input terminal.

From the above description it can be seen that the counter 52 counts up each time the number of pulses is equal to an integer multiple of N.

FIG. 2 shows also how the interpolation referred to above is carried out between two successive pulses on the line 30.

As already explained hereinabove, the divider 18 delivers during each comparing cycle pulses the number of which corresponds to a thickness unit. This number is, in fact, the number of pulses applied to the counter 16 for the same thickness unit but divided by D. The output pulses of the divider 18 are divided by ten in a divider 60 prior to being applied to a down counter 62 which is preset at the time of pulses $N_o$, $N_1$, $N_2$ .... to the value defined by the accumulator 36. At the end of each comparing cycle, the contents of the counter 62 are compared against the preset count of the counter 62 in a ratio calculator 78. It can be easily understood that, to be able to compare both numbers, the number furnished by the accumulator 36 must be divided by 10D. The ratio furnished by the circuit 78 gives the value of the least significant digit (one hundredth of a millimeter) which is stored in a register 66. It will be noted that if the thickness deviation with respect to the maximum is equal to an integer multiple of the thickness unit, at the end of the measuring time, the count of the counter 62 will be zero.

Correction circuits are connected to the counter 40 for correcting the measured thickness in accordance with the material composition and the temperature of the object. For this purpose, the contents of the counter 40 is transferred to a register 66 the least significant position of which being fed by the ratio calculator 78. Then the contents of the register 66 is serially transferred to a counter 70 by using a sequence of pulses which pass through a first correction unit 72 for a correction according to the composition and a second correction unit 74 for a correction according to the temperature.

Figure 3:
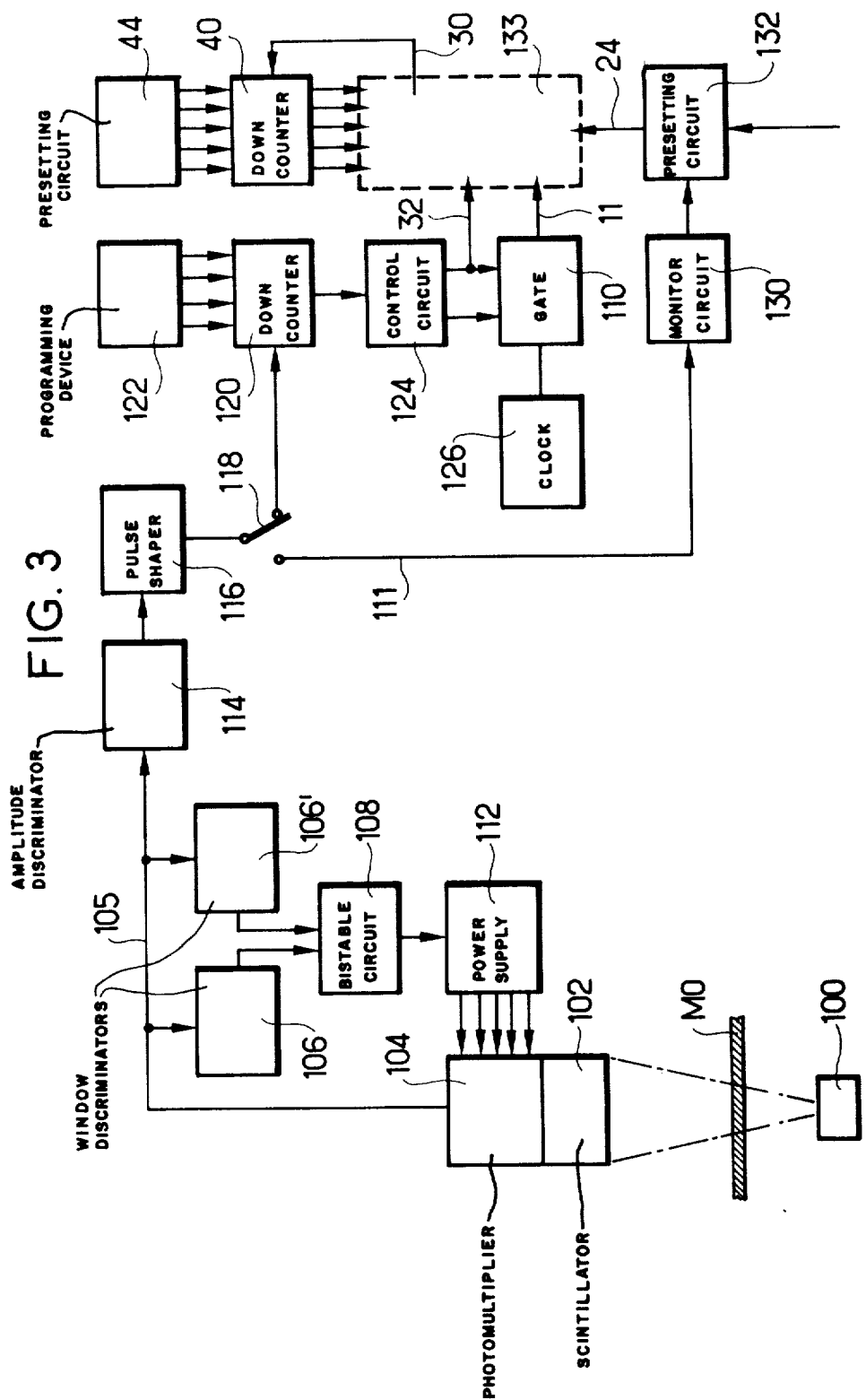
FIG. 3 is a block diagram of a thickness measurement system according to the present invention.

Now referring to FIG. 3, an object MO the thickness of which is to be measured is disposed between a gamma radiation source 100 and a scintillator 102. Photomultiplier 104 converts the output signal of the scintillator 102 into electrical pulses which are statistically distributed in accordance with the radioactivity of the isotope of the source 100. In order to control the operation of the photomultiplier 104 with regard to its operational data, two window discriminators 106 and 106' are connected to the output conductor 105 of the photomultiplier 104, each one detecting the pulse rate in a certain portion of the amplitude spectrum, said windows being selected in such a manner that under normal operational conditions the pulse rate is the same in both windows. The output pulses of each window discriminator are applied respectively to the 1-input and 0-input terminals of a bistable circuit 108. The duty cycle of the output signal of the bistable circuit 108 is then representative of the unbalance between the two windows. This signal, after conversion into an analog signal, is applied to the power supply 112 of the photomultiplier until the normal conditions of the photomultiplier 104 are reestablished.

Conductor 105 is also connected to an amplitude discriminator 114 which eliminates low amplitude pulses which are due, for example, to the noise of the photomultiplier 104. The output pulses of the amplitude discriminator 114 are applied to a pulse shaper 116 which delivers pulses having the same duration. In case of very high pulse rates on conductor 105, it may occur that two or even more adjacent shaped pulses are superposed to each other and will be later on detected as one pulse. This phenomenon produces the dead-time referred to hereinabove, the effect of which is corrected in the manner described with reference to FIG. 2.

The output pulses of the pulse shaper 116 are fed via one position of a switch 118 to the counting input of a down counter 120 which is preset to a given number by means of a programming device 122. When reset, the counter 120 delivers a disabling pulse to gate 110. The enabling of the gate 110 and the presetting of the counter 120 is obtained by means of a control circuit 124 which, in addition, monitors other operations. The control circuit 124 can be released, for example, by means of a detector which detects the presence of the object MO to be measured between the source 100 and the scintillator 102. The enabling time of the gate 110 determines the time interval during which the pulses from a clock unit 126 are applied to the conductor 11. The conductor 11 is connected to the circuits of FIG. 1 or 2, said circuits being indicated in FIG. 3 by the block 133 on dash lines.

It will be appreciated that, in the circuit of FIG. 3, the functions of the pulse rate from the photomultiplier 104 and from the clock unit 126 have been exchanged. The purpose of the exchange is to predetermine, by means of the programming circuit 122, a pulse number for which, according to statistics, a desired accuracy will be obtained knowing that the accuracy is proportional to the square root of the counted pulse number. For example, it will be determined that, for each thickness unit, a minimum number of pulses must be counted. Then, a number to which the counter 120 must be preset so as to obtain the statistical accuracy can be calculated.

It will be further appreciated that, with this device, the greater the measuring time interval, the thicker the object will be since the pulse rate is all the smaller as the radiation is attenuated. A thicker object thus corresponds to a higher number of pulses to be delivered by the clock unit 126. Therefore, the presetting of the comparator 20 must not be based on the pulse number of the thickest object but must be based on the thinnest object. Likewise, the operation of the counter 40 must be reversed so that it counts upwardly, starting with the minimum thickness. For this reason, in FIG. 3, the output line 30 is connected to an up-counter associated with a presetting circuit 44 which presets the counter 40 to a number representing the quotient of the minimum thickness divided by the thickness unit.

The other position of the switch 118 is used to compensate the decay of the radioactivity of the isotope of the radiation source 100 by an appropriate correction of the present number for the comparator 20. When there is no object across the radiation beam, the switch 118 is actuated so as to apply the output pulses of the pulse shaper 116 to a circuit 130. The pulse rate corresponds to a non-attenuated intensity which decreases with the aging of the source. When this pulse rate reaches predetermined levels, the monitor circuit 130 produces now preset numbers for the comparator 20.

It must be apparent that the modifications described with reference to FIG. 3 may be as well applicable to the circuits shown in FIGS. 1 and 2 in which the pulse rate of the output pulses of the photomultiplier is directly counted during a preset time interval.

When very thick objects are to be measured, the embodiment of FIG. 3 will be preferred so as to obtain a sufficiently high number of pulses on the conductor 105 and to achieve the required statistical accuracy. For very thin objects, the embodiments of FIGS. 1 and 2 will be preferred.

The embodiments of the present invention have been described as processing the output pulses of a scintillator receiving the radiation emitted by a radioisotope source. However, the invention is also applicable to thickness gauges using X-ray sources and/or radiation detector of the type providing an analog output signal the amplitude of which is representative of the thickness of the object disposed between the radiation source and the detector. However, in this case, it must be provided a converter circuit which converts the amplitude into pulses whose number per time unit is directly proportional to the amplitude.

The invention has been described in detail with reference to preferred embodiments thereof, but it will be understood that variations and modifications can be effected within the spirit and scope of the invention as described hereinabove and as defined in the appended claims.

What is claimed is:

1. A method of determining the value of a variable, the variation of which has an effect which varies according to an exponential function, the amplitude of this effect being known, comprising the steps of:
   presetting a counter to a predetermined count corresponding to a predetermined extreme value of said variable;
   generating a sequence of pulses the number of which is representative of the known amplitude of this effect;
   counting the pulses in said sequence and generating a pulse each time the number of pulses in said sequence corresponds to a predetermined standard value unit of said variable and
   modifying the count of said preset counter by a predetermined count at each pulse so generated, whereby at the end of said sequence the counter displays a count which corresponds to the value of said variable.

2. A method according to claim 1 wherein the step of counting the pulses and generating a pulse each time the number of pulses in said sequence corresponds to a predetermined standard unit value of said variable comprises the steps of
   dividing the number of pulses of said sequence by a coefficient D representative of said standard unit value;
   accumulating the pulses whose number have been so divided;
   counting the pulses in said sequence and comparing their number first to a number $n_o$ corresponding to the predetermined extreme value and then to the number accumulated at the time of each said signal; and
   generating said signal each time both numbers are equal.

3. A method according to claim 2 comprising the additional step of:
   modifying the dividing coefficient in accordance with the known amplitude of the effect.

4. A method according to claim 1 wherein the predetermined extreme value of said variable corresponds to the minimum expected value of said variable and wherein the preset count is increased by one at each said generated signal.

5. A method according to claim 1 wherein the predetermined extreme value of said variable corresponds to the maximum expected value of said variable and wherein the preset count is decreased by one at each said generated signal.

6. A method according to claim 5 and carried out on the output signal of a radiation detector which receives the radiation of a radiation source through an object the thickness $x_1$ of which is to be measured, the pulse rate $n_{x1}$ of the output signal of said radiation detector being related to the pulse rate n when no object is disposed between said radiation source and said detector, to the thickness $x_1$ and to the absorption coefficient u by the equation $n_{x1} = n \exp - ux_1$ wherein said signal is generated when the number of pulses is equal to $n_1 = n_0 + n_0/D$, $n_2 = n_1 + n_1/D$, $n_3 = n_2 + n_2/D$ and so on, $n_0$ being the expected pulse number for an object having the maximum expected thickness and the dividing coefficient D being given by the formula.

$$D = 1/\exp ud - 1$$

in which $d$ is the standard thickness unit.

7. An apparatus for determining the value of a variable the variation of which has an effect which varies according to an exponential, the amplitude of this effect being known, comprising converter means for generating a sequence of pulses the number of which is representative of the amplitude of the effect; a first preset counter which is preset at a predetermined count corresponding to a predetermined extreme value of said variable at the beginning of a sequence; counting means receiving the pulses of said sequence for generating a pulse each time the number of pulses in said sequence corresponds to a predetermined standard unit value of said variable, said pulses generated by the counting means being applied to said preset counter so as to modify the count thereof by a predetermined count corresponding to said standard unit value.

8. An apparatus as claimed in claim 7 wherein the counting means comprises a divider receiving the pulses of said sequence for dividing the number of pulses of said sequence by a number D representative of said standard unit value; an accumulator receiving the output pulses of said divider; a counter receiving the pulses of said sequence; and a comparator for comparing at time intervals during said sequence the contents of said counter against firstly a number $n_0$ representative of the maximum expected value and thereafter against the contents of said accumulator and for generating said pulse each time both numbers are equal, said generated pulse being applied to said first preset counter for modifying its contents, to said counter for the resetting thereof and to the accumulator for transferring its contents to the comparator, said contents so transferring its contents to the comparator, said contents so transferred being used as a reference for the following comparing cycle.

9. An apparatus according to claim 8 further comprising a second divider receiving the pulses of said sequence and dividing the number of pulses by a factor N representative of the amplitude of the effect, and a second preset counter which is preset to a count corresponding to the dividing coefficient D for the number $n_0$ and receiving the output pulses of said second divider, the count of said second preset counter being modified by a predetermined count for each output pulse of said second divider, the contents of said second preset counter being applied to said first divider so as to modify the dividing coefficient thereof.

10. An apparatus according to claim 8 further comprising an interpolation circuit which comprises a third preset counter which is preset at the beginning of each comparing cycle to a count corresponding to the accumulated sum divided by D of said accumulator, said third preset counter counting down each time it receives an output pulse from said divider, the contents of said third preset counter being compared at the end of each comparing cycle against the preset count of said preset counter at the beginning of said comparing cycle so as to determine the least significant digit of the contents of said first preset counter.

11. An apparatus as claimed in claim 7 for determining the thickness of an object disposed between a radiation source and a radiation detector wherein said converter means for generating a sequence of pulses the number of which is representative of the amplitude of the effect comprises a down-counter which is preset at the beginning of a measuring time interval to a count corresponding to a number fo pulses which should be counted to obtain a given accuracy and receiving the output pulses of said radiation detector; clock means providing periodic pulses and a gate receiving said periodic pulses and enabled during the time taken by said down-counter to count to zero.

12. An apparatus as claimed in claim 7 for determining the thickness of an object disposed between a radiation source and a radiation detector wherein said converter means for generating a sequence of pulses the number of which is representative of the amplitude of the effect comprises a gate receiving the output pulses of said radiation detector and clock means for enabling said gate during preset time intervals.

13. An apparatus as claimed in claim 8 for determining the thickness of an object disposed between a radiation source and a radiation detector further comprising a second counter receiving the output of the radiation detector during preset time intervals when no object is across the radiation beam so as to determine the intensity variations of the source and modify accordingly the value of $n_0$ when the number of pulses counted is equal to preset numbers.

14. An apparatus according to claim 7 for determining the thickness of an object disposed between a radiation source and a radiation detector including a photomultiplier further comprising two window discriminators receiving each the output pulses of said radiation detector and detecting each the pulses corresponding to a predetermined portion of the amplitude spectrum of the radiation source, and a control circuit receiving the output pulses of each window discriminator and producing a control signal representative of the difference between the numbers of pulses detected by each window discriminator, said control signal being applied to the power supply circuit of the photomultiplier so as to cancel said difference by modifying the voltage provided by the power supply circuit.

15. An apparatus according to claim 14 wherein said control circuit of the voltage provided by the power supply circuit of said photomultiplier comprises a bistable circuit the 1-input terminal of which receiving the output pulses of the other window discriminator, said bistable circuit providing on one of its two output terminals a signal the duty cycle of which is representative of said difference between the numbers of pulses detected, and integrating means for integrating the output signal of said bistable circuit so as to provide said control signal.

* * * * *